US011263552B2

(12) United States Patent
Garcia Delgado et al.

(10) Patent No.: US 11,263,552 B2
(45) Date of Patent: Mar. 1, 2022

(54) PREPARING COMPUTING DEVICES IN ANTICIPATION OF PREDICTED USER ARRIVAL

(71) Applicant: INTERNATIONAL BUSINESS MACHINES CORPORATION, Armonk, NY (US)

(72) Inventors: Carolina Garcia Delgado, Zapopan (MX); Humberto Orozco Cervantes, Tonalá (MX); Jorge Adrian Meneses Barragan, Guadalajara (MX); Paul Llamas Virgen, Ciudad Guzmán (MX)

(73) Assignee: International Business Machines Corporation, Armonk, NY (US)

( * ) Notice: Subject to any disclaimer, the term of this patent is extended or adjusted under 35 U.S.C. 154(b) by 607 days.

(21) Appl. No.: 16/186,630

(22) Filed: Nov. 12, 2018

(65) Prior Publication Data

US 2020/0151621 A1     May 14, 2020

(51) Int. Cl.
*G06F 17/00*     (2019.01)
*G06N 20/00*     (2019.01)
*G06F 9/445*     (2018.01)
*G06F 16/9537*   (2019.01)

(52) U.S. Cl.
CPC .......... *G06N 20/00* (2019.01); *G06F 9/4451* (2013.01); *G06F 16/9537* (2019.01)

(58) Field of Classification Search
CPC .............. G06F 16/9537; G06F 9/4451; G06F 16/24578; G06F 21/31; G06F 16/951; G06F 21/32; G06F 16/25; G06F 16/583; G06F 3/017; G06F 3/0488; G06N 20/00; G08G 1/07; G08G 1/087; G08G 1/095; H04N 7/191

USPC ........................................................... 706/12
See application file for complete search history.

(56) References Cited

U.S. PATENT DOCUMENTS

| 7,362,738 | B2 | 4/2008 | Taube et al. |
| 9,479,630 | B1 | 10/2016 | Chowdhury |
| 9,536,197 | B1 * | 1/2017 | Penilla ................ G06F 3/147 |
| 10,599,109 | B2 * | 3/2020 | Delaney ............... G05B 15/02 |
| 2002/0178224 | A1 * | 11/2002 | Kasajima .............. H04L 67/325 |
| | | | 709/206 |
| 2004/0181572 | A1 | 9/2004 | Lee et al. |
| 2005/0101292 | A1 | 5/2005 | Fukui |
| 2005/0104745 | A1 * | 5/2005 | Bachelder ............... G08G 1/07 |
| | | | 340/906 |

(Continued)

FOREIGN PATENT DOCUMENTS

| WO | 03060769 A1 | 7/2003 |
| WO | 2007036737 A1 | 4/2007 |
| WO | 2014128706 A1 | 8/2014 |

OTHER PUBLICATIONS

U.S. Appl. No. 15/420,142.*

(Continued)

*Primary Examiner* — Jason T Edwards
(74) *Attorney, Agent, or Firm* — Anthony M. Pallone (57) ABSTRACT

An embodiment of the invention may include a method, computer program product and system for computing device management. An embodiment may include preparing, by an estimated arrival time of a user at a location, at least one computing device needed by the user to perform a computing task at the location.

17 Claims, 5 Drawing Sheets

(56) References Cited

U.S. PATENT DOCUMENTS

| | | | |
|---|---|---|---|
| 2011/0069940 A1* | 3/2011 | Shimy | H04N 5/44543 |
| | | | 386/296 |
| 2012/0084003 A1* | 4/2012 | Park | G01C 21/20 |
| | | | 701/439 |
| 2014/0095683 A1* | 4/2014 | Knowles | H04L 67/303 |
| | | | 709/223 |
| 2014/0309788 A1 | 10/2014 | Blum | |
| 2014/0309789 A1* | 10/2014 | Ricci | H04W 4/21 |
| | | | 700/276 |
| 2015/0133168 A1 | 5/2015 | Jay | |
| 2015/0234832 A1* | 8/2015 | Gardner, III | G06Q 50/01 |
| | | | 707/749 |
| 2015/0373128 A1 | 12/2015 | Serbinis | |
| 2017/0309142 A1* | 10/2017 | Phillips | G08B 7/066 |
| 2019/0049263 A1* | 2/2019 | Waldman | G01C 21/3484 |

OTHER PUBLICATIONS

Mell et al., "The NIST Definition of Cloud Computing", Recommendations of the National Institute of Standards and Technology, NIST Special Publication 800-145, Sep. 2011, 7 pages.

Technical Disclosure Commons, "Pre-Arrival Destination Preparation", Defensive Publications Series, Oct. 2, 2017, 10 Pages, https://www.tdcommons.org/dpubs_series/728.

* cited by examiner

PREPARING COMPUTING DEVICES IN ANTICIPATION OF PREDICTED USER ARRIVAL

BACKGROUND

Embodiments of the present invention relate generally to the fields of computing devices and software applications, and more specifically, to management of computing devices and software application execution based on user location and predicted destination.

Device management is the process of managing the implementation, operation, and maintenance of a physical, or virtual, computing device. Device management is a broad term that includes various administrative tools and processes for the maintenance, operation, and upkeep of computing, network, mobile, and/or virtual devices. Although the term devices may usually refer to physical/hardware devices such as computers, laptops, servers, mobile phones, and other smart devices, devices may also refer to virtual devices such as virtual machines and virtual switches.

Application management is the process of managing the operation, maintenance, versioning, and upgrading of an application throughout its lifecycle. Application management includes best practices, techniques, and procedures essential to the operation, performance, and efficiency of a deployed application.

BRIEF SUMMARY

An embodiment of the invention may include a method, computer program product and system for computing device management. An embodiment may include preparing, by an estimated arrival time of a user at a location, at least one computing device needed by the user to perform a computing task at the location.

DETAILED DESCRIPTION

Before a computing device may be utilized for an intended purpose by a user at a desired location the device must be prepared. Preparation of the device may include actions such as powering the device and initiating/downloading any software applications, network connections, and/or digital information required for the intended purpose. Device management may further include actions such as installing device and component-level drivers and related software, configuring/preparing a device to perform as expected using a bundled software or with other devices, and implementing security measures. The time required to perform such actions may vary depending on characteristics of the computing device and characteristics of any utilized software applications. Moreover, the user of the computing device may have to account for this time when planning an intended use of the device.

For example, a user traveling to his/her place of work may have a meeting scheduled to begin at a designated time that morning or some other work task immediately due upon arrival. As part of the meeting or work task, the user may require access to software applications such as productivity software and/or communication software via their workstation. The user may also require the acquisition (e.g., downloading, accessing), via the workstation, of certain digital information in preparation for the meeting or work task. Consequently, in order for the user to be prepared and on time for the meeting or work task, he/she must arrive to the workplace with a sufficient amount of time before the designated meeting start time or the immediately due work task to access their workstation, access the required productivity software and/or communication software, and gather any needed digital information.

A potential problem arises when the user experiences a delay to his/her arrival which may result from any number of unforeseen logistical or personal activities. The delayed arrival may also delay the preparation process of the user's workstation and may subsequently delay the user's timely participation in the scheduled meeting or the user's timely completion of the immediately due work task. Such a problem may present itself not only in the context of using a computing device at a work-related destination for a work-related activity, but also in the context of using a computing device at a recreational or personal destination for a recreational or personal activity (e.g. preparing a smart tv for use by when the user arrives to his/her home).

Figure 1:
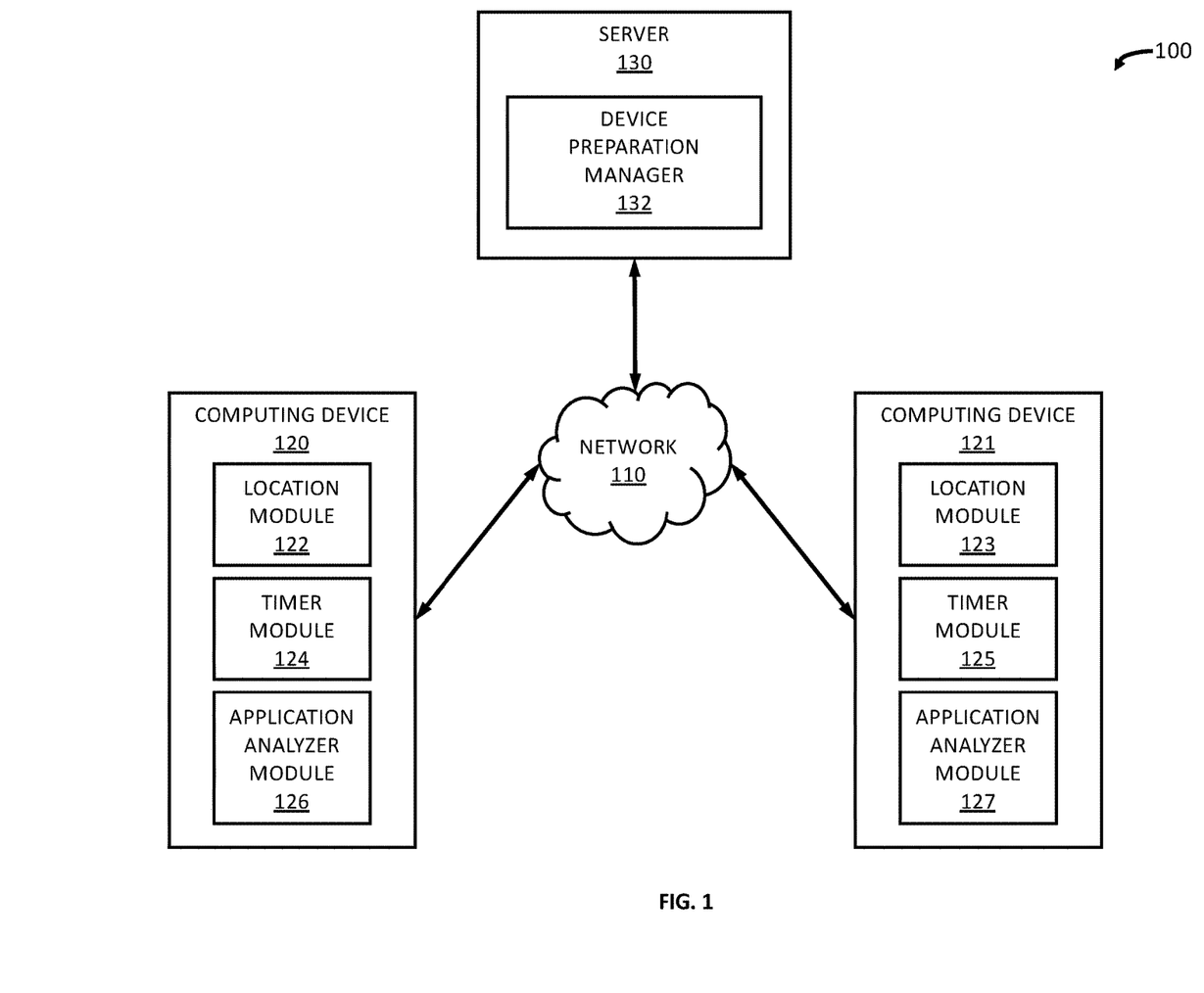
FIG. 1 is a block diagram illustrating a computing device preparation (CDP) system, in accordance with an embodiment of the present invention.

In an effort to mitigate the problem stated above, embodiments of the present invention may include a computing device preparation (CDP) system 100, described below, which provides a method for advanced preparation of one or more computing devices for an intended use by a user, based on a geographic location of the user and a predicted destination of the user. CDP system 100 may include a device preparation manager which may utilize a machine learning algorithm to dynamically predict the destination of the user based on a current geographic location and previous travel patterns (e.g., previous geographic locations, previous destinations, previous times of travel) of the user. The machine learning algorithm may also dynamically predict the one or more computing devices and one or more software applications which may be used by the user at his/her predicted destination based, at least in part, on available information concerning, but not limited to, previous user behavior (e.g., computing device usage, application usage), user profile information, and/or user calendar information. Based on the above predictions, CDP system 100 may, in some embodiments, access the predicted one or more computing devices and one or more software applications in order to prepare them prior to arrival by the user at the predicted destination. In embodiments of the present invention, CDP system 100 may have access to a predefined set of computing devices. Furthermore, in embodiments of the present invention preparing a computing device may include actions such as, but not limited to, powering on the computing device, opening/accessing one or more software applications via the computing device, establishing network connections via the computing device, downloading data, or any combination thereof.

Embodiments of the present invention will now be described in detail with reference to the accompanying Figures.

FIG. 1 is a functional block diagram illustrating computing device preparation system 100, in accordance with an embodiment of the present invention. In an example embodiment, CDP system 100 may include computing device 120, computing device 121, and server 130, all interconnected via network 110.

In an embodiment CDP system 100 may be operable to prepare one or more computing devices for use by a user at a predicted destination according to an optimal time in advance of the user's arrival to the predicted destination. In preparing the one or more computing devices, CDP system 100 may implement a device preparation manager which utilizes a machine learning algorithm to perform one or more of the following actions: determine one or more computing devices, from a predetermined set of computing devices accessible by CDP system 100 and the device preparation manager, to access and/or power on; determine one or more software applications, data, and network connections to access and/or establish; and determine an estimated for performance of the preceding actions. The machine learning algorithm may infer decisions of the user, based on dynamic scenarios, not only for one or more computing devices, but also for one or more software applications, or any combination thereof. Inputs to the machine learning algorithm may include previous behaviors of the user (e.g., computing devices usage, travel patterns, daily routines), digital calendar information belonging to the user, profile information belonging to the user, geographical location of the user, travel speed and direction of the user, and computing characteristics (e.g., battery level, processing power, application processing consumption) of the predetermined set of computing devices accessible by CDP system 100. As inputs to the machine learning algorithm may change in response to variations in user activity, the machine learning algorithm may automatically re-adapt itself.

In an embodiment, CDP system 100 may operate in a training mode during which the device preparation manager may log actions of the user and track travel patterns of the user. CDP system 100 may also access and track calendar information of the user, scheduled routines of the user, profile information of the user, and usage history of the predetermined set of computing devices by the user. During the training mode, the machine learning algorithm may analyze the above mentioned inputs and output, via the device preparation manager, suggested device preparation related actions to the user concerning one or more computing devices of the predetermined set of computing devices accessible by CDP system 100. Feedback from the user (e.g., whether or not the user selected the suggested action) during the training mode may be used as an input to the machine learning algorithm in order to facilitate learning/adaptation by the algorithm and to determine a confidence/probability for each suggested action.

In an embodiment where CDP system 100 is not operating in a training mode, the device preparation manager may take one or more actions concerning the one or more computing devices, of the predetermined set of computing devices accessible by CDP system 100, based, in part, on learned schedules/routines of the user, feedback from the user concerning actions suggested during training mode, and a confidence/probability threshold associated with an action.

In various embodiments, network 110 is a communication channel capable of transferring data between connected devices. In an example embodiment, network 110 may be the Internet, representing a worldwide collection of networks and gateways to support communications between devices connected to the Internet. Moreover, network 110 may include, for example, wired, wireless, or fiber optic connections which may be implemented as an intranet network, a local area network (LAN), a wide area network (WAN), or any combination thereof. In further embodiments, network 110 may be a Bluetooth network, a WiFi network, or a combination thereof. In general, network 110 can be any combination of connections and protocols that will support communications between computing device 120, computing device 121, and server 130.

In an example embodiment, computing device 120 may include location module 122, timer module 124, and application analyzer module 126. Computing device 120 may be a laptop computer, a notebook, a tablet computer, a netbook computer, a personal computer (PC), a desktop computer, a personal digital assistant (PDA), a smart phone, a wearable computing device, a smart tv, or any other electronic device or computing system capable of sending, and receiving data to and from other computing devices such as server 130, via network 110, and capable of supporting the functionality required of embodiments of the invention. For example, computing device 120 may support a communication link (e.g., wired, wireless, direct, via a LAN, via the network 110, etc.) between computing device 120 and server 130. In embodiments of the present invention, computing device 120 may be part of the predetermined set of computing devices accessible by device preparation manager 132 of CDP system 100. In an example embodiment, computing device 120 may be a smart phone belonging to the user. In another embodiment, computing device 120 may be a mobile electronic device (e.g. a smart phone, a laptop, a wearable computing device) or computing system capable of sending and receiving data to and from other computing devices such as server 130, via network 110, and capable of supporting the functionality required of embodiments of the invention. For example, a smartphone belonging to the user may transmit information including geographic location of the user, speed of travel of the user, and direction of travel of the user. In yet another embodiment, computing device 120 may be a smart electronic device (e.g. a smart tv, a smart speaker) capable of sending, and receiving data to and from other computing devices such as server 130, via network 110, and capable of supporting the functionality required of embodiments of the invention. Data sent from computing device 120 may include data from location module 122, timer module 124, and/or application analyzer module 126. Data received by computing device 120 may include data/instructions sent, via server 130 and network 110, from device preparation manager 132, described below. Computing device 120 may be described, generally, with respect to FIG. 3 below. In an example embodiment, computing device 120 (e.g., the user's smart phone) be in possession of the user and may transmit, via location module 122, timer module 124, and application analyzer module 126, data to server 130.

In an example embodiment, computing device 121 may include location module 123, timer module 125, and application analyzer module 127. Computing device 121 may be a laptop computer, a notebook, a tablet computer, a netbook computer, a personal computer (PC), a desktop computer, a personal digital assistant (PDA), a smart phone, a wearable computing device, a smart tv, or any other electronic device or computing system capable of sending, and receiving data to and from other computing devices such as server 130, via network 110, and capable of supporting the functionality required of embodiments of the invention. For example, computing device 121 may support a communication link (e.g., wired, wireless, direct, via a LAN, via the network 110, etc.) between computing device 121 and server 130. In embodiments of the present invention, computing device 121 may be part of the predetermined set of computing devices accessible by device preparation manager 132 of CDP system 100. In an example embodiment, computing device 121 may be a computer of the user located at the user's place of work. In another embodiment, computing device 121 may be a mobile electronic device (e.g. a smartphone, a laptop, a wearable computing device) or computing system capable of sending and receiving data to and from other computing devices such as server 130, via network 110, and capable of supporting the functionality required of embodiments of the invention. In yet another embodiment, computing device 121 may be a smart electronic device (e.g. a smart tv, a smart speaker) capable of sending, and receiving data to and from other computing devices such as server 130, via network 110, and capable of supporting the functionality required of embodiments of the invention. Data sent from computing device 121 may include data from location module 123, timer module 125, and/or application analyzer module 127. Data received by computing device 121 may include data/instructions sent, via server 130 and network 110, from device preparation manager 132, described below. Computing device 121 may be described, generally, with respect to FIG. 3 below. In an example embodiment, computing device 121 may collect and send, via location module 123, timer module 125, and application analyzer module 127, data to server 130.

In an example embodiment, location modules 122 and 123 may be a program, or subroutine contained in a program, that may operate to determine a geographic location of a user associated with computing device 120 and/or computing device 121. Location modules 122 and 123 collect geographic location data from computing devices 120 and 121, respectively. Furthermore, location modules 122 and 123 may also operate to send and receive data to and from other computing devices such as server 130, via computing devices 120 and 121, respectively, and network 110. In an example embodiment, location module 122 and/or location module 123 may determine a geographic location of a user when the user is not near a designated or predicted location (e.g., the user's place of work, the user's home). Location module 122 and/or location module 123 may utilize technologies such as GPS, WiFi, available location services, or any combination thereof. Location module 122 and/or location module 123 may also communicate, via computing devices 120 and 121, respectively, and network 110, with other computing devices to acquire geographic location information. In an example embodiment, location module 122 may transmit, via computing device 120 and network 110, geographic location data collected from computing device 120 to server 130. The collected geographic location data and computing device 120 are associated with the user. While location modules 122 and 123 are shown as part of computing devices 120 and 121, respectively, in other embodiments, location modules 122 and 123 may be represented as one location module contained within server 130 and capable of accessing computing devices 120 and 121.

In an example embodiment, timer modules 124 and 125 may be a program, or subroutine contained in a program, that may operate to determine an optimal time by which to prepare one or more computing devices (e.g., computing device 120, computing device 121). An optimal time may be interpreted as an amount of time needed to prepare one or more computing devices for use by a user at a designated/predicted destination, the conclusion of which coincides with arrival of the user at the designated/predicted destination. In determining an optimal time, timer modules 124 and 125 may evaluate characteristics of computing devices 120 and 121, respectively, and one or more accessible software applications, including, but not limited to, device boot-up times, device power levels, device processing capabilities, initialization times for network connections, software application loads, initialization times of one or more accessible software applications, processing consumption of one or more accessible software applications, or any combination thereof.

For example, a given timer module may, at first instance, calculate a ready time for each device and/or software application as follows:

Time for calculating software file(s) to be opened and computing device(s) to be powered on=3 minutes.

Time for opening a software file=10 seconds.

A headphone's delay for powering on is 10 seconds and 20 seconds for Bluetooth pairing=30 seconds.

Time for establishing WIFI connection and authentication=15 seconds.

Time for establishing ssh connections=15 seconds.

Time to establish WebEx conference connection=20 seconds.

Time to open conference slide sharing=40 seconds.

Time to open a bridge call=10 seconds.

In this example it may be determined that three files must be opened (30 seconds), a WebEx conference connection must be established (20 seconds), a bridge call must be opened (10 seconds), and conference slide sharing must be opened (40 seconds). Therefore, the optimal time by which to prepare the device in this example would be 4 minutes and 40 seconds (3 minutes+30 seconds+20 seconds+10 seconds+40 seconds) prior to arrival of the user.

Timer modules 124 and 125 may also operate to send and receive data to and from other computing devices such as server 130, via computing devices 120 and 121, respectively, and network 110. In an example embodiment, timer module 125 may determine an optimal time to prepare computing device 121. In an example embodiment, timer module 125 may transmit, via computing device 121 and network 110, data collected from computing device 121 to server 130. The transmitted data may include an optimal time by which to prepare computing device 121. While timer modules 124 and 125 are shown as part of computing devices 120 and 121, respectively, in other embodiments, timer modules 124 and 125 may be represented as one timer module contained within server 130 and capable of accessing computing devices 120 and 121.

In an example embodiment, application analyzer modules 126 and 127 may be a program, or subroutine contained in a program, that may operate to determine which one or more software applications to execute on computing device 120 and computing device 121, respectively. Application analyzer modules 126 and 127 may also operate to determine the time at which the determined one or more software applications are executed on computing device 120 and computing device 121, respectively. Determinations of application analyzer modules 126 and 127 may be based, in part, on inputs such as a digital calendar of the user, an agenda of the user, a scheduled routine of the user, one or more scheduled tasks of the user, emails of the user, or any combination thereof. Furthermore, application analyzer modules 126 and 127 may also operate to send and receive data to and from other computing devices such as server 130, via computing devices 120 and 121, respectively, and network 110. In an example embodiment, application analyzer module 127 may transmit, via computing device 121 and network 110, data collected from computing device 120 to server 130. The transmitted data may include determinations for one or more software applications to execute by computing device 121 and times by which to execute them. While application analyzer modules 126 and 127 are shown as part of computing devices 120 and 121, respectively, in other embodiments, application analyzer modules 126 and 127 may be represented as one application analyzer module contained within server 130 and capable of accessing computing devices 120 and 121.

In an example embodiment, server 130 may include device preparation manager 132. Server 130 may be a desktop computer, a notebook, a laptop computer, a blade server, a networked computer appliance, a virtual device, or any other networked electronic device or computing system capable of receiving and sending data from and to other computing devices such as computing devices 120 and 121, via network 110, and capable of supporting the functionality required of embodiments of the invention. In an example embodiment, server 130 may function to process data received from computing devices 120 and 121, via network 110. While server 130 is shown as a single device, in other embodiments, cloud server 140 may be comprised of a cluster or plurality of computing devices, working together or working separately. Server 130 may be described generally with respect to FIG. 3 below.

In an example embodiment, device preparation manager 132 may be a program, or subroutine contained in a program, that may operate to process data received from location modules 122-3, timer modules 124-5, and application analyzer modules 126-7, via computing devices 120 and 121, respectively. In processing the received data, device preparation manager 132 may implement the machine learning algorithm of CDP system 100, described above, to dynamically predict a destination of the user and to dynamically predict one or more computing devices and one or more software applications which may be used by the user at his/her predicted destination. Based on the results of the machine learning algorithm, device preparation manager 132 may also operate to access the predicted one or more computing devices and one or more software applications in order to prepare them prior to arrival by the user at the predicted destination. In an example embodiment, device preparation manager 132 may dynamically predict a destination of the user, one or more computing devices, and one or more software applications which may be used by the user at his/her predicted destination, based on information received from location modules 122-3, timer modules 124-5, and application analyzer modules 126-7. The operations and functions of device preparation manager 132 are described in further detail below with regard to FIG. 2.

Figure 2:
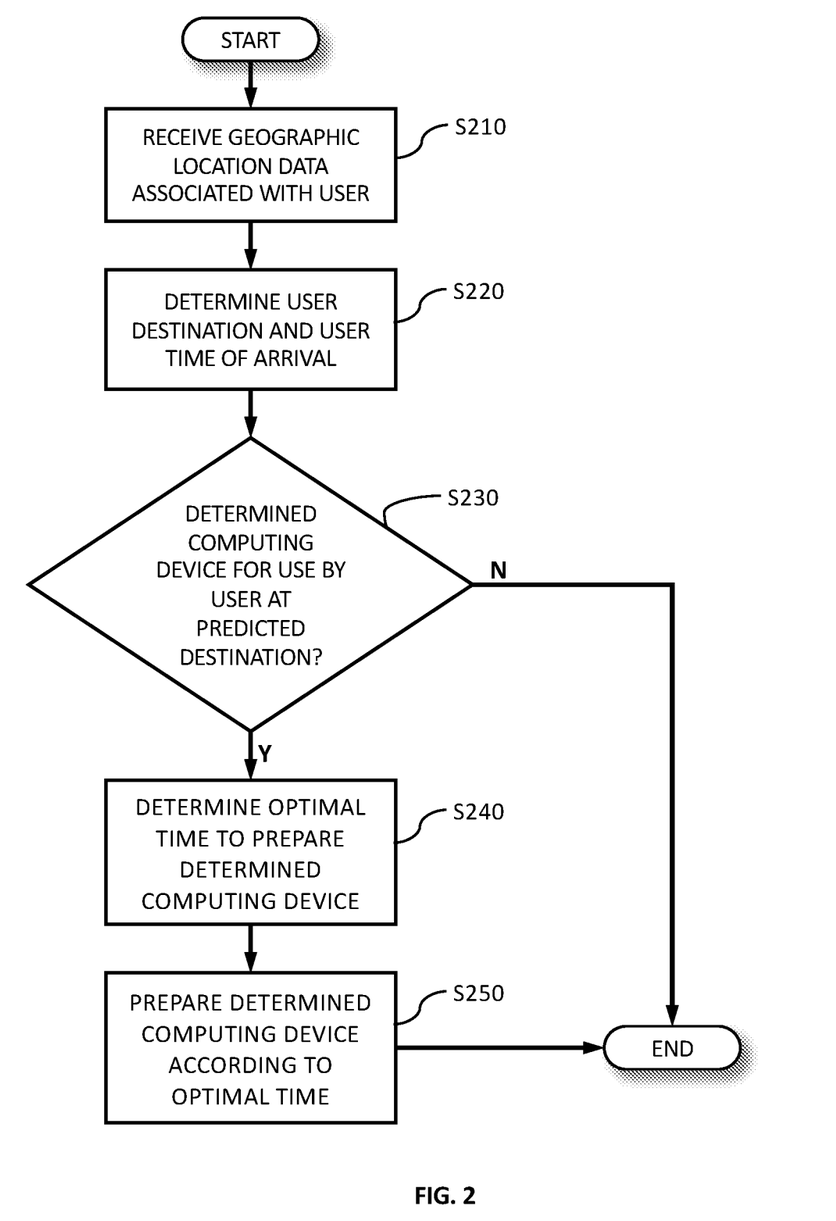
FIG. 2 is a flowchart illustrating the operations of the device preparation manager of FIG. 1, in accordance with an embodiment of the invention.

FIG. 2 shows a flowchart illustrating the operations of device preparation manager 132 in accordance with an example embodiment of the invention. Referring to step S210, device preparation manager 132 may receive, via network 110, geographic location data originating from location module 122 of computing device 120. In embodiments of present invention, the geographic location data may be associated with a user of computing device 120 and used to track the location of the user. In an example embodiment, computing device 120 may be a smart phone associated with a user and in possession of the user. Computing device 120 (i.e., the smart phone of the user) may use technologies including GPS, WiFi, other available location services, or any combination thereof, to determine and track, via location module 122, the geographic location of the user. In addition to geographic location data, location module 122 of computing device 120 may, in an example embodiment, also determine and gather travel related data in proximity to the geographic location of the user including, but not limited to, a speed of the user, traffic/road conditions, and a direction of travel for the user. In step S210, device preparation manager 132 may receive geographic location data of the user and travel related data in proximity of the user's geographic location. In an example embodiment, the received geographic location data of the user and travel related data in proximity of the user's geographic location may be transmitted, via network 110, from location module 122 of computing device 120 to device preparation manager 132.

Referring to step S220, device preparation manager 132 may utilize the machine learning algorithm of CDP system 100, described above, to predict/determine a destination of the user and a time of arrival of the user at the predicted destination. The destination of the user and the time of arrival of the user at the predicted destination may be based, in part, on the data received and/or gathered in step S210, known calendar information of the user, known scheduled routines of the user, profile information of the user, computing device (e.g., the predetermined set of computing devices accessible by device preparation manager 132) usage history of the user, or any combination thereof. In an example embodiment, device preparation manager 132 determines the user's destination to be the user's place or work based on the data received in step S210, known calendar information of the user, and known scheduled routines of the user. Furthermore, in an example embodiment, device preparation manager 132 determines a time of arrival by the user at the user's place of work based on the travel related data received in step S210.

Referring to step S230, device preparation manager 132 may determine if one or more computing devices, of the predetermined set of computing devices accessible by device preparation manager 132, will be utilized by the user upon his/her arrival at the determined destination. In an embodiment of the present invention, device preparation manager 132 may make this determination based on the user destination determined in step S220 and data received/accessed from application analyzer modules (e.g., application analyzer modules 126 and 127) located within the predetermined set of computing devices accessible by device preparation manager 132 (e.g., computing devices 120 and 121), and further based on known calendar information of the user, and known scheduled tasks of the user. In another embodiment, the application analyzer module may be local to device preparation manager 132. In an example embodiment, device preparation manager 132 determines a software application to execute on computing device 121 based on the determined user destination, information received from application analyzer module 127, and further based on known calendar information of the user and known scheduled tasks of the user. Furthermore, in an example embodiment, device preparation manager 132 determines digital presentation and conferencing software applications for execution on the user's computing workstation located at the user's place of work.

Referring to step S240, in response to determining a software application to execute on computing device 121, device preparation manager 132 may determine an optimal time by which to prepare computing device 121. In an embodiment of the present invention, device preparation manager 132 may make this determination based on data received/accessed from timer modules (e.g., timer modules 124 and 125) located within the predetermined set of computing devices accessible by device preparation manager 132 (e.g., computing devices 120 and 121). In another embodiment, the timer module may be local to device preparation manager 132. In an example embodiment, device preparation module 132 determines an optimal time by which to prepare computing device 121 based on data received from timer module 125, via network 110. Furthermore, in an example embodiment, device preparation module 132 determines the optima by which to prepare the user's workstation, the presentation software application, and the conferencing software application to be five minutes prior to arrival by the user at his/her place of work.

Referring to step S250, device preparation manager 132 may cause the determined computing device to be prepared according to the determined optimal time. In an example embodiment, device preparation module 132 causes the user's workstation (i.e., computing device 121) to power on and to execute both the presentation software application and the conferencing software application five minutes prior to the time of arrival by the user at the user's place of work. Consequently, the user's workstation will be ready for use by the time the user arrives to work.

In an alternative embodiment where the computing device determined for use by the user, at a determined destination, is traveling with the user, device preparation manager 132 may, as part of determining an optimal time by which to prepare the computing device, evaluate the current battery level of the computing device to determine if sufficient power is available to account for the user's time of arrival at the determined destination. In such an embodiment, if device preparation manager 132 determines that the remaining battery power is insufficient to power to the computing device during the user's remaining travel time to the determined destination and power the computing device for use by the user upon arrival at the determined destination, device preparation manager 132 may cause an alternate computing device, of the predetermined set of computing devices accessible by device preparation manager 132, to be prepared for use by the user upon arrival at the determined destination. However, if device preparation manager 132 determines that the remaining battery power is sufficient to power to the computing device during the user's remaining travel time to the determined destination and power the computing device for use by the user upon arrival at the determined destination, device preparation manager 132 may prepare the computing device for use by the user upon arrival at the determined destination.

Figure 3:
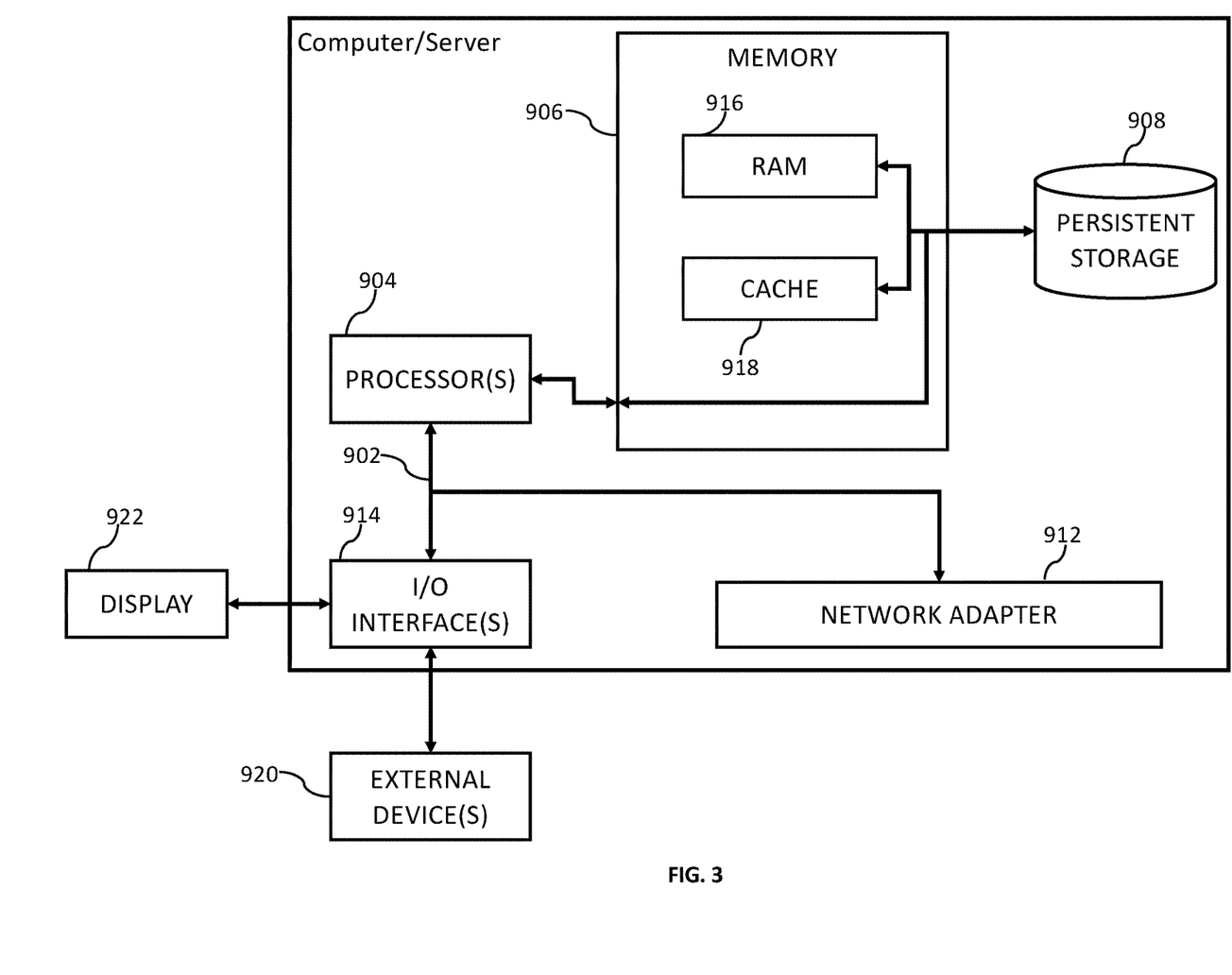
FIG. 3 is a block diagram depicting the hardware components of the device preparation system of FIG. 1, in accordance with an embodiment of the invention.

FIG. 3 depicts a block diagram of components of computing device 120, computing device 121, and server 130, in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Computing device 120, computing device 121, and server 130 include communications fabric 902, which provides communications between computer processor(s) 904, memory 906, persistent storage 908, network adapter 912, and input/output (I/O) interface(s) 914. Communications fabric 902 can be implemented with any architecture designed for passing data and/or control information between processors (such as microprocessors, communications and network processors, etc.), system memory, peripheral devices, and any other hardware components within a system. For example, communications fabric 902 can be implemented with one or more buses.

Memory 906 and persistent storage 908 are computer-readable storage media. In this embodiment, memory 906 includes random access memory (RAM) 916 and cache memory 918. In general, memory 906 can include any suitable volatile or non-volatile computer-readable storage media.

The programs location module 122, timer module 124, and application analyzer module 126 in computing device 120; location module 123, timer module 125, and application analyzer module 127, in computing device 121; and device preparation manager 132 in server 130 are stored in persistent storage 908 for execution by one or more of the respective computer processor(s) 904 via one or more memories of memory 906. In this embodiment, persistent storage 908 includes a magnetic hard disk drive. Alternatively, or in addition to a magnetic hard disk drive, persistent storage 908 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 908 may also be removable. For example, a removable hard drive may be used for persistent storage 908. Other examples include optical and magnetic disks, thumb drives, and smart cards that are inserted into a drive for transfer onto another computer-readable storage medium that is also part of persistent storage 908.

Network adapter 912, in these examples, provides for communications with other data processing systems or devices. In these examples, network adapter 912 includes one or more network interface cards. Network adapter 912 may provide communications through the use of either or both physical and wireless communications links. The programs location module 122, timer module 124, and application analyzer module 126 in computing device 120; location module 123, timer module 125, and application analyzer module 127, in computing device 121; and device preparation manager 132 in server 130 may be downloaded to persistent storage 908 through network adapter 912.

I/O interface(s) 914 allows for input and output of data with other devices that may be connected to computing device 120, computing device 121, and server 130. For example, I/O interface 914 may provide a connection to external devices 920 such as a keyboard, keypad, a touch screen, and/or some other suitable input device. External devices 920 can also include portable computer-readable storage media such as, for example, thumb drives, portable optical or magnetic disks, and memory cards. Software and data used to practice embodiments of the present invention, e.g., programs location module 122, timer module 124, and application analyzer module 126 in computing device 120; location module 123, timer module 125, and application analyzer module 127, in computing device 121; and device preparation manager 132 in server 130, can be stored on such portable computer-readable storage media and can be loaded onto persistent storage 908 via I/O interface(s) 914. I/O interface(s) 914 can also connect to a display 922.

Display 922 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

While steps of the disclosed method and components of the disclosed systems and environments have been sequentially or serially identified using numbers and letters, such numbering or lettering is not an indication that such steps must be performed in the order recited and is merely provided to facilitate clear referencing of the method's steps. Furthermore, steps of the method may be performed in parallel to perform their described functionality.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
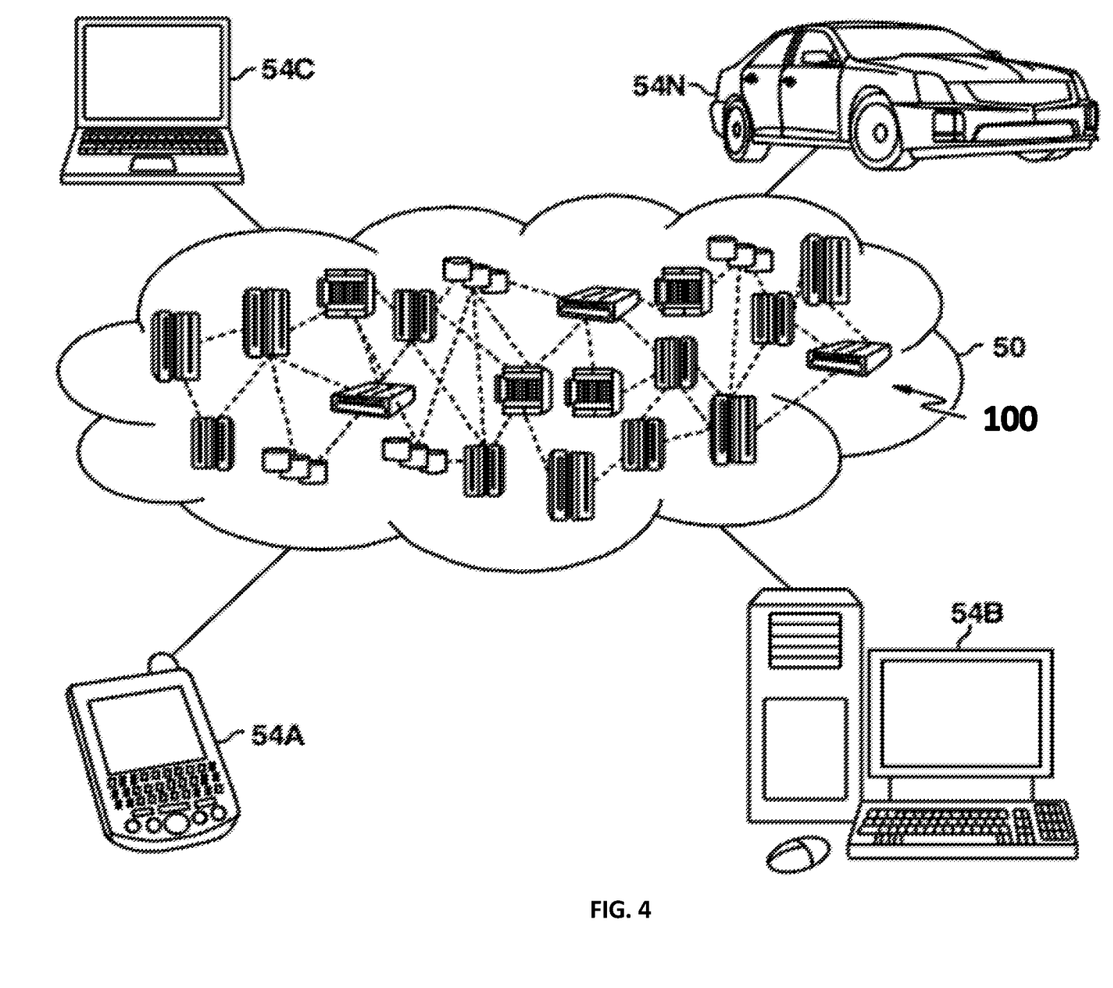
FIG. 4 depicts a cloud computing environment in accordance with an embodiment of the present invention.

Referring now to FIG. 4, illustrative cloud computing environment 50 is depicted. As shown, cloud computing environment 50 includes one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 100 and cloud computing environment 50 can communicate with any type of computerized device over any type of network and/or network addressable connection (e.g., using a web browser).

Figure 5:
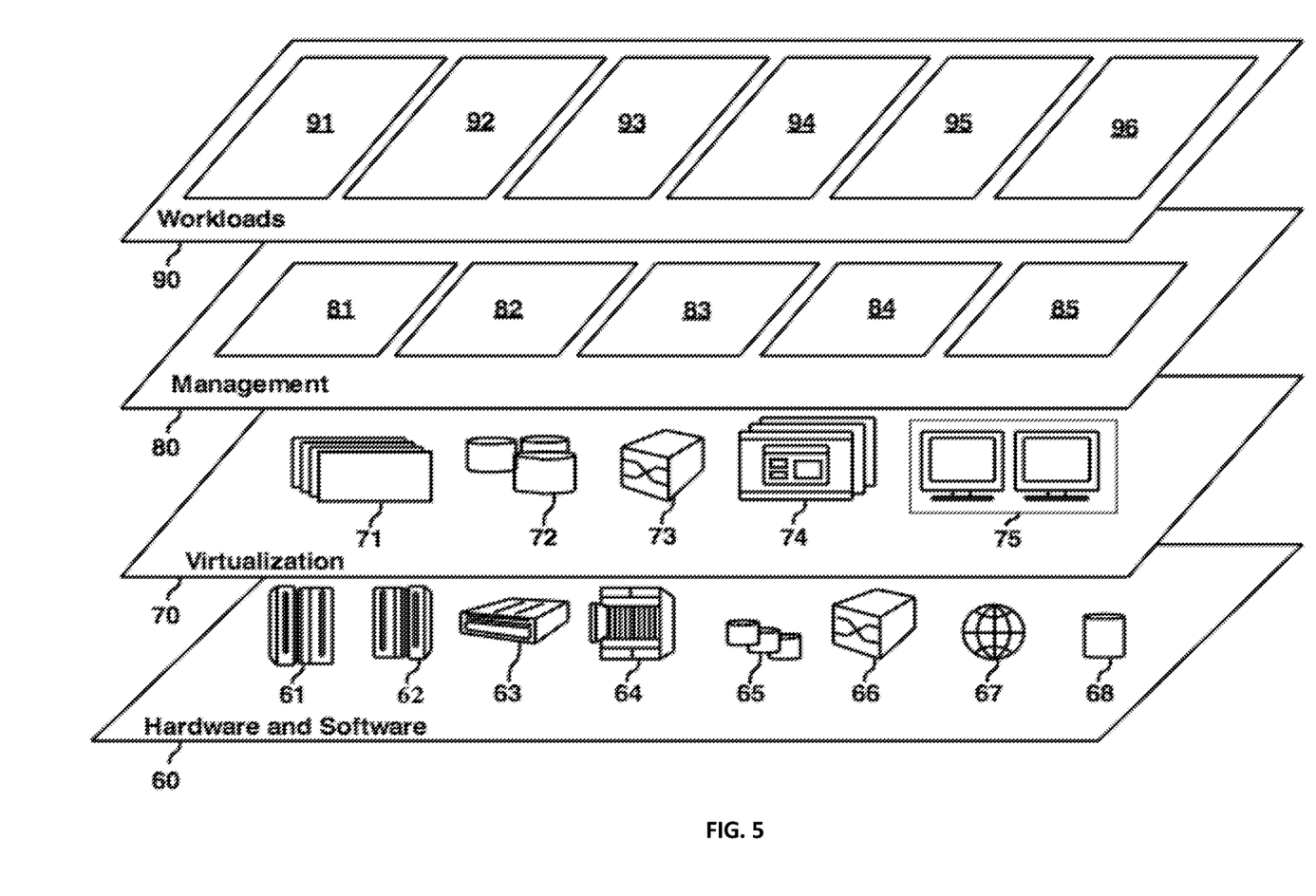
FIG. 5 depicts abstraction model layers in accordance with an embodiment of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and computing device preparation system 96. Computing device preparation system 96 may relate to advanced preparation of one or more computing devices for an intended use by a user, based on a geographic location of the user and a predicted destination of the user.

The descriptions of the various embodiments of the present invention have been presented for purposes of illustration, but are not intended to be exhaustive or limited to the embodiments disclosed. The terminology used herein was chosen to explain the principles of the one or more embodiments, the practical application or technical improvement over technologies found in the marketplace, or to enable others of ordinary skill in the art to understand the embodiments. Various modifications, additions, substitutions, and the like will be apparent to those of ordinary skill in the art without departing from the scope and spirit of the invention, as defined in the following claims.

What is claimed is:

1. A computer-implemented method for computing device management, the method comprising:
   determining geographic location data of a user when the user is not at a designated location, wherein the geographic location data comprises global positioning system information of the user, and wherein the geographic location data also comprises travel related data in proximity to the received geographic location data, and wherein the travel related data comprises a speed of the user, a direction of travel of the user, and road conditions;
   determining a destination location of the user and a time of arrival of the user at the destination location, wherein the determined destination location is the designated location, and wherein the designated location is the user's place of work;
   determining at least one computing device, of one or more computing devices, that will be utilized by the user upon arrival at the destination location to perform a computing task, wherein the destination location and the at least one computing device is determined via a machine-learning algorithm based on inputs of the user comprising the geographic location data, previous travel patterns, an agenda, one or more scheduled tasks, and usage history of the one or more computing devices;
   determining one or more software applications to execute on the at least one computing device; and
   preparing the at least one computing device, wherein preparing the at least one computing device comprises powering on the at least one computing device and executing the one or more software applications on the at least one computing device prior to the time of arrival of the user at the destination location.

2. The computer-implemented method of claim 1, wherein the destination location and the at least one computing device that will be utilized by the user is determined via the machine-learning algorithm based on inputs further comprising at least one element from the group consisting of: previous travel times of the user, calendar information of the user, scheduled routines of the user, profile information of the user, emails of the user, and the destination location.

3. The computer-implemented method of claim 2, wherein the one or more computing devices and the at least one computing device are part of a predefined set of computing devices accessible by the user and the machine-learning algorithm.

4. The computer-implemented method of claim 2, wherein the estimated arrival time is determined by the machine-learning algorithm based on the received travel related data in proximity to the received geographic location data.

5. The computer-implemented method of claim 2, wherein the one or more software applications to execute is determined via the machine-learning algorithm based on at least one from the group consisting of: the calendar information of the user, the agenda of the user, the scheduled routines of the user, the one or more scheduled tasks of the user, the profile information of the user, the emails of the user, the destination location, and usage history, by the user, of the at least one computing device.

6. The computer-implemented method of claim 5, further comprising:
   determining an optimal time for preparing the at least one computing device based on at least one from the group consisting of: boot-up time of the at least one computing device, power level of the at least one computing device, processing capabilities of the at least one computing device, initialization times for network connections of the at least one computing device, application loads of the one or more software applications, initialization times of the one or more software applications, and processing consumption of the one or more software applications, wherein conclusion of the optimal time coincides with the time of arrival of the user at the destination location, and wherein preparing the at least one computing device comprises at least one action from the group consisting of: powering on the at least one computing device, opening the one or more software applications via the at least one computing device, establishing network connections via the at least one computing device, and downloading data via the at least one computing device.

7. The computer-implemented method of claim 1, further comprising:
preparing, by the time of arrival of the user at the destination location, an alternate computing device, of the one or more computing devices, for use by the user to perform the computing task at the destination location in response to determining that a power level of the at least one computing device is insufficient to perform the computing task at the destination location.

8. The computer-implemented method of claim 5, further comprising:
operating in a training mode, wherein operating in a training mode comprises:
tracking travel patterns, calendar information, and scheduled routines of the user;
logging usage history, by the user, of the one or more computing devices;
suggesting, to the user, device preparation related actions for the one or more computing devices based on the travel patterns, the calendar information, the scheduled routines of the user, and the usage history of the one or more computing devices;
receiving feedback from the user concerning the suggested device preparation related actions for the one or more computing devices; and
evaluating the feedback to determine a confidence level for each of the suggested device preparation related actions.

9. A computer program product for computing device management, the computer program product comprising:
one or more computer-readable non-transitory tangible storage devices and program instructions stored on at least one of the one or more computer-readable non-transitory tangible storage devices, the program instructions comprising:
program instructions to determine geographic location data of a user when the user is not at a designated location, wherein the geographic location data comprises global positioning system information of the user, and wherein the geographic location data also comprises travel related data in proximity to the received geographic location data, and wherein the travel related data comprises a speed of the user, a direction of travel of the user, and road conditions;
program instructions to determine a destination location of the user and a time of arrival of the user at the destination location, wherein the determined destination location is the designated location;
program instructions to determine at least one computing device, of one or more computing devices, that will be utilized by the user upon arrival at the destination location to perform a computing task, wherein the destination location and the at least one computing device is determined via a machine-learning algorithm based on inputs of the user comprising the geographic location data, previous travel patterns, an agenda, one or more scheduled tasks, and usage history of the one or more computing devices;
program instructions to determine one or more software applications to execute on the at least one computing device; and
program instructions to prepare the at least one computing device, wherein preparing the at least one computing device comprises powering on the at least one computing device and executing the one or more software applications on the at least one computing device prior to the time of arrival of the user at the destination location.

10. The computer program product of claim 9, wherein the destination location and the at least one computing device that will be utilized by the user is determined via the machine-learning algorithm based on inputs further comprising at least one from the group consisting of: previous travel times of the user, calendar information of the user, scheduled routines of the user, profile information of the user, emails of the user, and the destination location.

11. The computer program product of claim 10, wherein the one or more software applications to execute is determined via the machine-learning algorithm based on at least one from the group consisting of: the calendar information of the user, the agenda of the user, the scheduled routines of the user, the one or more scheduled tasks of the user, the profile information of the user, the emails of the user, the destination location, and usage history, by the user, of the at least one computing device.

12. The computer program product of claim 11, further comprising:
program instructions to determine an optimal time for preparing the at least one computing device based on at least one from the group consisting of: boot-up time of the at least one computing device, power level of the at least one computing device, processing capabilities of the at least one computing device, initialization times for network connections of the at least one computing device, application loads of the one or more software applications, initialization times of the one or more software applications, and processing consumption of the one or more software applications, wherein conclusion of the optimal time coincides with the time of arrival of the user at the destination location, and wherein preparing the at least one computing device comprises at least one action from the group consisting of: powering on the at least one computing device, opening the one or more software applications via the at least one computing device, establishing network connections via the at least one computing device, and downloading data via the at least one computing device.

13. A computer system for computing device management, the computer system comprising:
one or more processors, one or more computer-readable memories, one or more computer-readable tangible storage devices, and program instructions stored on at least one of the one or more computer-readable tangible storage devices for execution by at least one of the one or more processors via at least one of the one or more memories, the program instructions comprising:
program instructions to determine geographic location data of a user when the user is not at a designated location, wherein the geographic location data comprises global positioning system information of the user, and wherein the geographic location data also comprises travel related data in proximity to the received geographic location data, and wherein the travel related data comprises a speed of the user, a direction of travel of the user, and road conditions;

program instructions to determine a destination location of the user and a time of arrival of the user at the destination location, wherein the determined destination location is the designated location;

program instructions to determine at least one computing device, of one or more computing devices, that will be utilized by the user upon arrival at the destination location to perform a computing task, wherein the destination location and the at least one computing device is determined via a machine-learning algorithm based on inputs of the user comprising the geographic location data, previous travel patterns, an agenda, one or more scheduled tasks, and usage history of the one or more computing devices;

program instructions to determine one or more software applications to execute on the at least one computing device; and program instructions to prepare the at least one computing device, wherein preparing the at least one computing device comprises powering on the at least one computing device and executing the one or more software applications on the at least one computing device prior to the time of arrival of the user at the destination location.

14. The computer system of claim 13, wherein the destination location and the at least one computing device that will be utilized by the user is determined via a machine-learning algorithm based on inputs comprising at least one from the group consisting of: previous travel times of the user, calendar information of the user, scheduled routines of the user, profile information of the user, emails of the user, and the destination location.

15. The computer system of claim 14, wherein the one or more software applications to execute is determined via the machine-learning algorithm based on at least one from the group consisting of: the calendar information of the user, the agenda of the user, the scheduled routines of the user, the one or more scheduled tasks of the user, the profile information of the user, the emails of the user, the destination location, and usage history, by the user, of the at least one computing device.

16. The computer system of claim 15, further comprising:
program instructions to determine an optimal time for preparing the at least one computing device based on at least one from the group consisting of: boot-up time of the at least one computing device, power level of the at least one computing device, processing capabilities of the at least one computing device, initialization times for network connections of the at least one computing device, application loads of the one or more software applications, initialization times of the one or more software applications, and processing consumption of the one or more software applications, wherein conclusion of the optimal time coincides with the time of arrival of the user at the destination location, and wherein preparing the at least one computing device comprises at least one action from the group consisting of: powering on the at least one computing device, opening the one or more software applications via the at least one computing device, establishing network connections via the at least one computing device, and downloading data via the at least one computing device.

17. The computer system of claim 13, further comprising:
preparing, by the time of arrival of the user at the destination location, an alternate computing device, of the one or more computing devices, for use by the user to perform the computing task at the destination location in response to determining that a power level of the at least one computing device is insufficient to perform the computing task at the destination location.

* * * * *